(12) United States Patent
Ouchi et al.

(10) Patent No.: US 9,912,836 B2
(45) Date of Patent: Mar. 6, 2018

(54) IMAGE PROCESSING SYSTEM, IMAGE PROCESSING METHOD, AND IMAGE PROCESSING DEVICE FOR AUTO COLOR SELECTION

(71) Applicants: Satoshi Ouchi, Tokyo (JP); Takuji Kamada, Kanagawa (JP); Hiroyuki Sakuyama, Tokyo (JP)

(72) Inventors: Satoshi Ouchi, Tokyo (JP); Takuji Kamada, Kanagawa (JP); Hiroyuki Sakuyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/238,751

(22) Filed: Aug. 17, 2016

(65) Prior Publication Data

US 2017/0054873 A1  Feb. 23, 2017

(30) Foreign Application Priority Data

Aug. 18, 2015  (JP) ................................ 2015-161083

(51) Int. Cl.
| | |
|---|---|
| *H04N 1/411* | (2006.01) |
| *H04N 1/00* | (2006.01) |
| *H04N 1/64* | (2006.01) |
| *H04N 1/407* | (2006.01) |

(52) U.S. Cl.
CPC ......... *H04N 1/411* (2013.01); *H04N 1/00023* (2013.01); *H04N 1/00037* (2013.01); *H04N 1/00082* (2013.01); *H04N 1/407* (2013.01); *H04N 1/648* (2013.01); *H04N 2201/0094* (2013.01)

(58) Field of Classification Search
None
See application file for complete search history.

(56) References Cited

U.S. PATENT DOCUMENTS 5,920,645 A  7/1999  Aida

FOREIGN PATENT DOCUMENTS

| JP | 08-065530 | 3/1996 |
|---|---|---|
| JP | 2791314 | 6/1998 |

*Primary Examiner* — Barbara Reinier
(74) *Attorney, Agent, or Firm* — Harness, Dickey & Pierce, P.L.C.

(57) ABSTRACT

An image processing system includes: an image recording unit configured to record an output image corresponding to an input image on a recording medium; an image compression unit configured to compress the input image for transmission; and a determining unit configured to determine whether the input image is a color image or a monochrome image according to a first determination rule if the output image is to be recorded on the recording medium, and determine whether the input image is the color image or the monochrome image according to a second determination rule different from the first determination rule if the input image is to be compressed for transmission.

9 Claims, 11 Drawing Sheets

IMAGE PROCESSING SYSTEM, IMAGE PROCESSING METHOD, AND IMAGE PROCESSING DEVICE FOR AUTO COLOR SELECTION

CROSS-REFERENCE TO RELATED APPLICATIONS

The present application claims priority under 35 U.S.C. § 119 to Japanese Patent Application No. 2015-161083, filed Aug. 18, 2015. The contents of which are incorporated herein by reference in their entirety.

BACKGROUND OF THE INVENTION

1. Field of the Invention

The present invention relates generally to an image processing system, an image processing method, and an image processing device.

2. Description of the Related Art

For example, a technology that is referred to as auto color selection (ACS) in which it is determined whether an input image, such as an original image that is read by a scanner, is a color image or a monochrome image in an image processing system, such as a multifunction peripheral/printer (MFP) is known.

In the MFP having the ACS function, in the case where an output image corresponding to the input image is recorded (copied and reproduced) on a recording medium by a plotter, when the result of ACS determination indicates that the input image is a color image, the operation mode is set to a color mode and a copy process using CMYK four plates is performed according to the output image for color image. On the other hand, when the result of ACS determination indicates that the input image is a monochrome image, the operation mode is set to a monochrome mode and a copy process using only a single K color is performed according to the output image for monochrome image.

A technology for controlling an operation of copying and reproducing an image according to the result of ACS determination without pre-scan is also known (for example, see Japanese Unexamined Patent Application Publication No. H8-65530). In the technology according to Japanese Unexamined Patent Application Publication No. H8-65530, signal conversion suitable for reproduction of monochrome images is started in order to generate image data of a K-plate that is the first plate and, when the ACS determination ends during this conversion and the determination result indicates that the input image is a color image, the signal conversion is switched to one suitable for reproducing color images.

On the other hand, many recent MFPs have a function of transmitting an image to the outside. For example, an input image, such as an original image that is read by a scanner, is compressed for transmission. A technology is also known in which, when the image is compressed for transmission, the compression method is switched according to whether the input image is a color image or a monochrome image (For example, see Japanese Patent No. 2791314).

An image compressed for transmission is often browsed in an environment where the original from which the image originates does not exist, for example, the compressed image is distributed as a file attached to an electronic mail via a network and is browsed at the distribution destination. For this reason, even when the input image contains a small chromatic area (for example, 10×10 mm/A4 size), determining that the input image is not a color image but a monochrome image and performing compression for monochrome images is often advantageous to users with respect to the transmission costs and the transmission rate.

On the other hand, with respect to copy reproduction, an output image that is recorded on a recording medium is often compared to the original and high reproducibility is required. For this reason, determining that the above-described input image containing the chromatic area (for example, 10×10 mm/A4 size) is a monochrome image and performing a copy process in a monochrome mode has a risk that reproducibility satisfying the user cannot be obtained.

Particularly in the case where copy reproduction is performed using the method according to Japanese Unexamined Patent Application Publication No. H8-65530, when it is determined that the above-described input image containing the chromatic area (for example, 10×10 mm/A4 size) is a monochrome image, an image void may occur in the chromatic area, which significantly lowers the user satisfaction.

SUMMARY OF THE INVENTION

According to one aspect of the present invention, an image processing system includes an image recording unit, an image compression unit, and a determining unit. The image recording unit is configured to record an output image corresponding to an input image on a recording medium. The image compression unit is configured to compress the input image for transmission. The determining unit is configured to determine whether the input image is a color image or a monochrome image according to a first determination rule if the output image is to be recorded on the recording medium, and determine whether the input image is the color image or the monochrome image according to a second determination rule different from the first determination rule if the input image is to be compressed for transmission.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
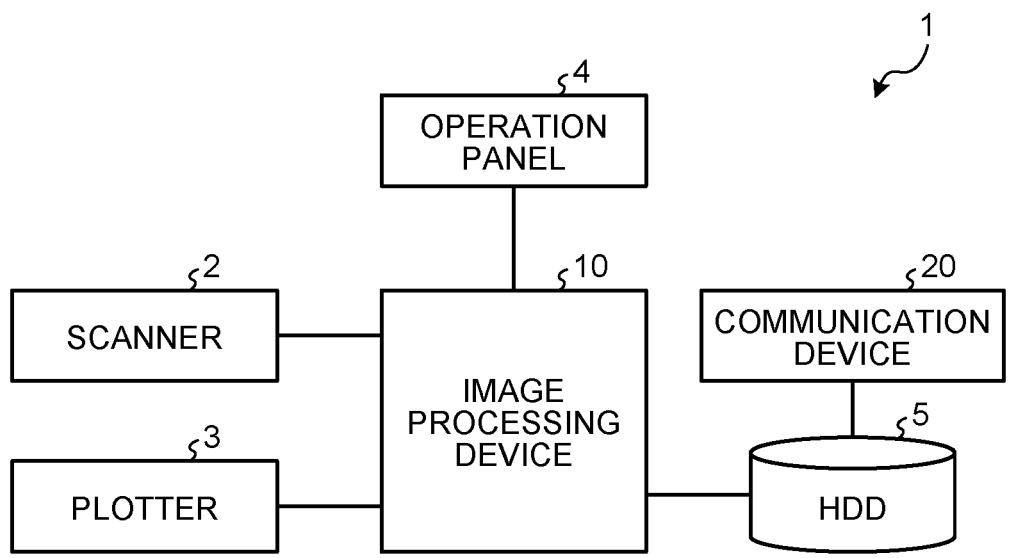
FIG. 1 is a block diagram of an exemplary hardware configuration of an image processing system.

The terminology used herein is for the purpose of describing particular embodiments only and is not intended to be limiting of the present invention.

As used herein, the singular forms "a", "an" and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the accompanying drawings embodiments of the image processing system, the image processing method, and the image processing device according to the present invention will be described in detail below. The embodiments described below are examples in which the present invention is applied to an MFP that is an exemplary image processing system. Note that the present invention is not limited to these examples and is effectively applicable to various image processing systems that have a function of recording an output image corresponding to an input image on a recording medium and a function of compressing the input image for transmission.

First Embodiment

FIG. 1 is a block diagram of an exemplary hardware configuration of an image processing system 1 according to a first embodiment of the present invention. The image processing system 1 according to the first embodiment includes, for example, as illustrated in FIG. 1, a scanner 2, a plotter 3, an operation panel 4, an image processing device 10, a hard disk drive (HDD) 5, and a communication device 20.

The scanner 2 optically reads an original to acquire an original image and transmits the original image to the image processing device 10. The original image that is transmitted from the scanner 2 to the image processing device 10 is, for example, RGB data (RGB image signal) in which each of RGB colors is represented by, for example, 8 bits. For the first embodiment, an example where the original image acquired by the scanner 2 serves as an input image to be processed is assumed. Note that the input image to be processed is not limited to the original image acquired by the scanner 2. For example, the image acquired by the communication device 20 from the network may serve as the input image to be processed.

The plotter 3 is an image recording unit that records an output image (output image corresponding to the input image) that is output from the image processing device 10 on a recording medium when the input image is used for copy reproduction. When the input image is a color image, the plotter 3 performs a copy process using four CMYK plates according to the output image for color image that is obtained by the image processing device 10 converting the input image. The plotter 3 also performs a copy process using only a single K color according to the output image for monochrome image that is obtained by the image processing device 10 converting the input image.

The operation panel 4 accepts an operation input from a user to the image processing system 1 according to the first embodiment. According to the first embodiment, the information that is output by the operation panel 4 according to the operation input from the user is used to determine whether the input image is used for copy reproduction or compression transmission. Among the information that is output by the operation panel 4 according to the operation input from the user, information representing the use of the input image is referred to as "use information". The use information is input to the image processing device 10.

The image processing device 10 performs various types of processing on the input image. In other words, when the input image is used for copy reproduction, the image processing device 10 converts the input image into an output image for copy reproduction and the output image is output to the plotter 3. The image processing device 10 switches the process of converting an input image to an output image according to the determination result of color/monochrome determination on the input image. When the input image is used for compression transmission, the image processing device 10 stores the input image for compression transmission in the HDD 5. The image processing device 10 stores the determination result of color/monochrome determination on the input image in the HDD 5 together with the input image. The details of the image processing device 10 will be described below.

The HDD 5 is a storage device that, when the input image is used for compression transmission, temporarily stores the input image to be compressed and transmitted in association with the result of color/monochrome determination on the input image. The HDD 5 may be used in order to store, in addition to the input image and the result of color/monochrome determination, other various types of information that are dealt with in the image processing system 1.

When the input image is used for compression transmission, the communication device 20 reads the input image to be compressed and transmitted from the HDD 5, compresses the input image, and transmits the compressed image through network distribution. The communication device 20 reads the result color/monochrome determination that is stored in the HDD 5 together with the input image and switches the compression method for the input image according to the determination result. The details of the communication device 20 will be described below.

Figure 2:
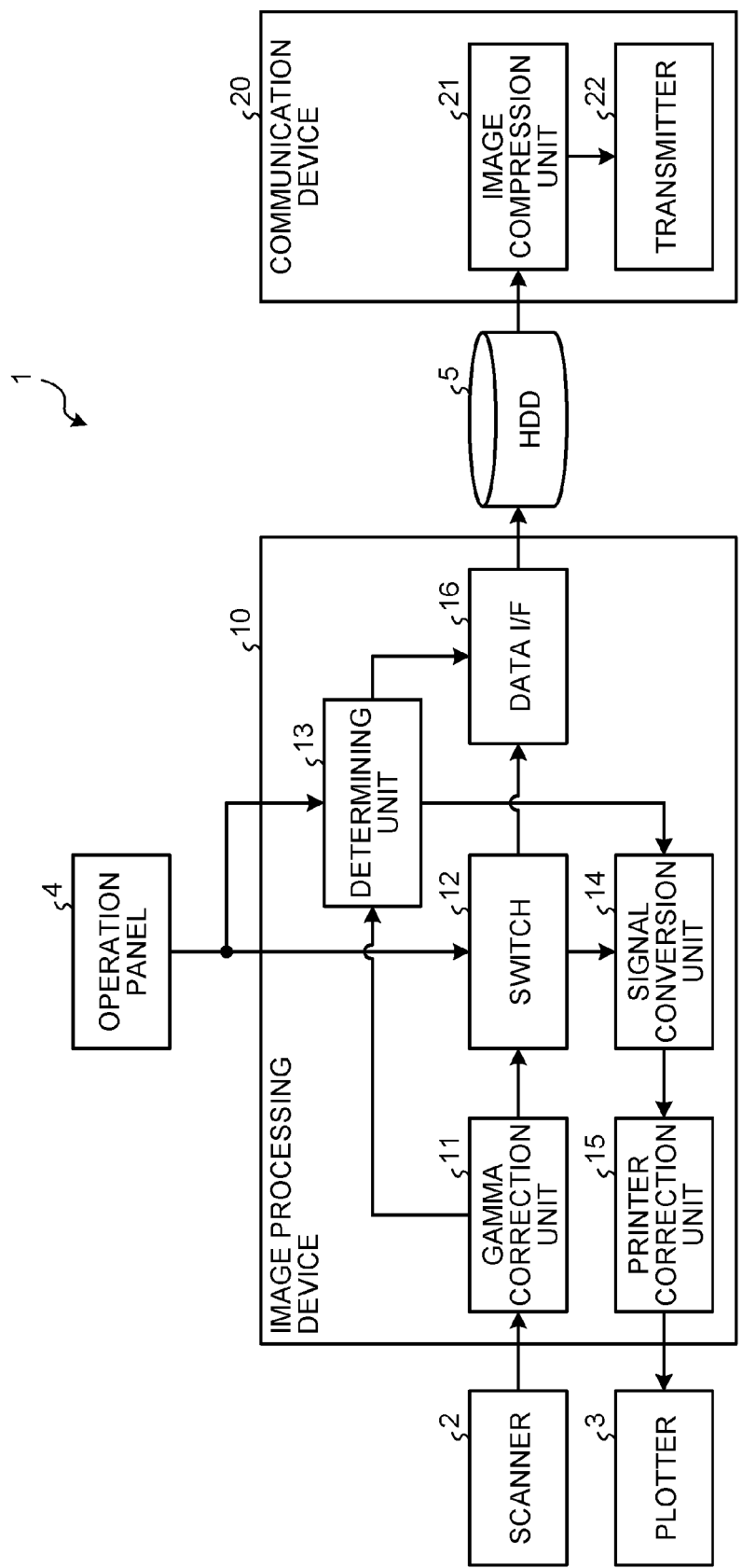
FIG. 2 is a block diagram of an exemplary functional configuration of an image processing device and a communication device.

FIG. 2 is a block diagram of an exemplary functional configuration of the image processing device 10 and the communication device 20. First of all, the image processing device 10 will be described.

The image processing device 10 includes, as functional components, for example, as illustrated in FIG. 2, a gamma correction unit 11, a switch 12, a determining unit 13, a signal conversion unit 14, a printer correction unit 15, and a data I/F 16. When, for example, hardware mainly consists of a general-purpose computer system including, for example, a CPU, a RAM, and a ROM is used as the image processing device 10, the functional components can be implemented by the CPU using the RAM as a work area and executing a predetermined program that is stored in, for example, the ROM. Part of or all the functional components of the image processing device 10 may be implemented using dedicated hardware, such as an application specific integrated circuit (ASIC) or a field-programmable gate array (FPGA).

The gamma correction unit 11 performs primary conversion processing (gamma correction) on each color signal of the input image to be processed (the RGB image signal in which each of RGB colors is represented by 8 bits) in order to adjust the tone balance of each color. According to the first embodiment, the signal after converted by the gamma correction unit 11 is the concentration linear RGB image signal (where white corresponds to a signal value of 0). The input image on which the gamma correction unit 11 has performed the gamma correction (hereinafter, referred to as "gamma-corrected input image") is transmitted to the switch 12 and the determining unit 13. According to the first embodiment, the gamma-corrected input image is transmitted to both the switch 12 and the determining unit 13. Alternatively, the input image may be transmitted without gamma correction.

The switch 12 selectively switches the route for the gamma-corrected input image to any one of a route to the signal conversion unit 14 and a route to the data I/F 16 according to the use information that is input from the operation panel 4. In other words, when the use information that is input from the operation panel 4 represents copy reproduction, the switch 12 transmits the gamma-corrected input image to the signal conversion unit 14 and, when the use information that is input from the operation panel 4 represents compression transmission, the switch 12 transmits the gamma-corrected input image to the data I/F 16.

The determining unit 13 performs color/monochrome determination on the gamma-corrected input image. The determining unit 13 performs color/monochrome determination on the gamma-corrected input image according to a determination rule that differs between the case where the input image is used for copy reproduction and a case where the input image is used for compression transmission. In other words, when the use information that is input from the operation panel 4 represents copy reproduction, the determining unit 13 determines whether the gamma-corrected input image is a color image or a monochrome image according to a first determination rule and, when the use information that is input from the operation panel 4 represents compression transmission, the determining unit determines whether the gamma-corrected input image is a color image or a monochrome image according to a second determination rule different from the first determination rule. Note that the first determination rule is a determination rule according to which it is more easily determined that the gamma-corrected input image is a color image than according to the second determination rule.

A specific example of the determining unit 13 will be described here. In this example, it is determined whether each pixel block of a given number of pixels contained in the gamma-corrected input image is a chromatic block and, when the number of chromatic blocks exceeds a threshold, it is determined that the gamma-corrected input image is a color image. According to the first embodiment, the threshold for the number of chromatic blocks (hereinafter, referred to as an "image determination threshold") is switched according to whether the input image is used for copy reproduction or compression transmission. In other words, in the case where the use information that is input from the operation panel 4 represents copy reproduction, when the number of chromatic-blocks contained in the gamma-corrected input image exceeds a first image determination threshold, the determining unit 13 determines that the input image is a color image and, when the number of chromatic-blocks is equal to or smaller than the first image determination threshold, the determining unit 13 determines that the input image is a monochrome image (first determination reference). In the case where the use information that is input from the operation panel 4 represents compression transmission, when the number of chromatic-blocks contained in the gamma-corrected input image exceeds a second image determination threshold larger than the first image determination threshold, the determining unit 13 determines that the gamma-corrected input image is a color image and, when the number of chromatic-blocks is equal to or smaller than the second image determination threshold, the determining unit 13 determines that the gamma-corrected input image is a monochrome image (second determination reference).

Figure 3:
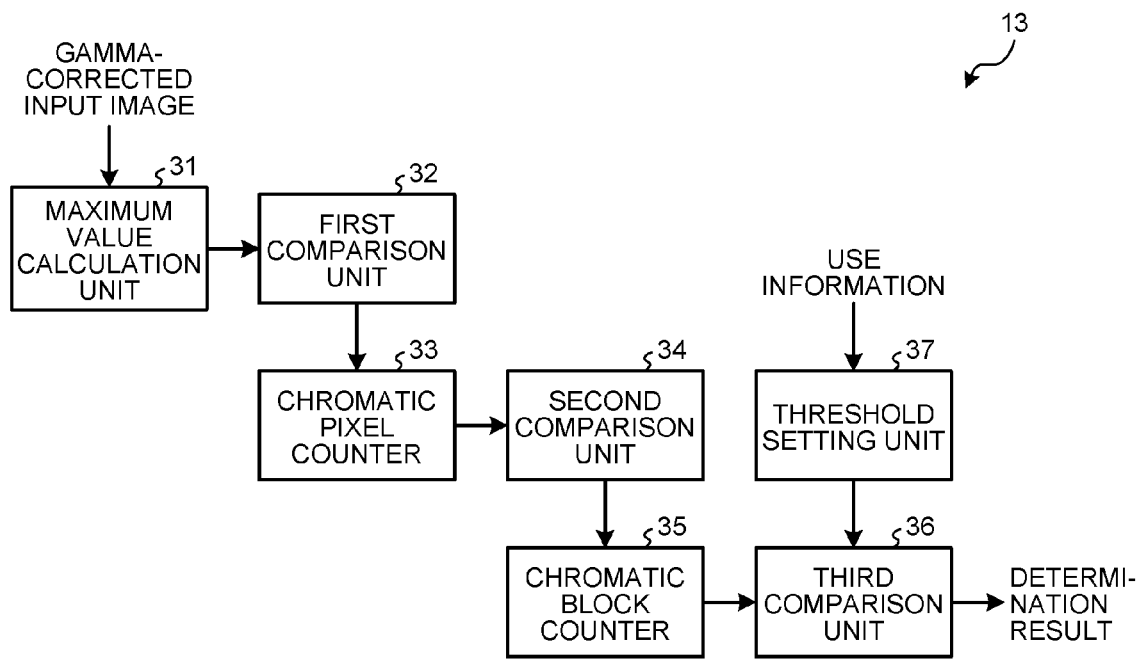
FIG. 3 is a block diagram of an exemplary configuration of a determining unit.

FIG. 3 is a block diagram of an exemplary configuration of the determining unit 13 that performs the above-described determination. The determining unit 13 includes, for example, as illustrated in FIG. 3, a maximum value calculation unit 31, a first comparison unit 32, a chromatic-pixel counter 33, a second comparison unit 34, and a chromatic block counter 35, a third comparison unit 36, and a threshold setting unit 37.

The maximum value calculation unit 31 calculates a maximum value $d[i,j]$ ($=\Delta RGB$) of absolute values of differences between RGB with respect to each pixel of the gamma-corrected input image.

The first comparison unit 32 compares the maximum value $d[i,j]$, which is calculated by the maximum value calculation unit 31, with a given threshold TH1 (hereinafter, referred to as the "pixel determination threshold"). The first comparison unit 32 determines that a pixel in which the maximum value $d[i,j]$ exceeds the pixel determination threshold TH1 is a chromatic pixel and determines that a pixel in which the maximum value $d[i,j]$ is equal to or smaller than the pixel determination threshold TH1 is an achromatic pixel.

The chromatic pixel counter 33 counts the number C1 of chromatic pixels contained in each pixel block of a given number of pixels (for example, 4 lines×4 pixels) contained in the gamma-corrected input image.

The second comparison unit 34 compares the number C1 of chromatic pixels in the pixel block that is counted by the chromatic pixel counter 33 with a given threshold (hereinafter, referred to as a "block determination threshold") TH2. The second comparison unit 34 determines that a pixel block in which the number C1 of chromatic pixels exceeds the block determination threshold TH2 is a chromatic block and determines that a pixel block in which the number C1 of chromatic pixels is equal to or smaller than the block determination threshold TH2 is an achromatic block.

The chromatic block counter 35 counts the number C2 of chromatic blocks contained in the gamma-corrected input image.

The third comparison unit 36 compares the number C2 of chromatic blocks, which is counted by the chromatic block counter 35, with an image determination threshold TH3. When the number C2 of chromatic blocks exceeds the image determination threshold TH3, the third comparison unit 36 determines that the gamma-corrected input image is a color image and, when the number C2 of the chromatic blocks is equal to or smaller than the image determination threshold TH3, the third comparison unit 36 determines that the gamma-corrected input image is a monochrome image. When the input image is used for copy reproduction, the third comparison unit 36 uses a first image determination threshold TH3_1 as the image determination threshold TH3 and compares the number C2 of chromatic blocks with the first image determination threshold TH3_1. When the input image is used for compression transmission, the third comparison unit 36 uses, as the image determination threshold TH3, a second image determination threshold TH3_2 larger than the first image determination threshold TH3_1 and compares the number C2 of chromatic blocks with the second image determination threshold TH3_2.

The threshold setting unit 37 selectively sets any one of the first image determination threshold TH3_1 and the second image determination threshold TH3_2 in the third comparison unit 36 according to the use information that is input from the operation panel 4. In other words, when the use information that is input from the operation panel 4 represents copy reproduction, the threshold setting unit 37 sets the first image determination threshold TH3_1 serving as the image determination threshold TH3 in the third comparison unit 36 and, when the use information that is input from the operation panel 4 represents compression transmission, the threshold setting unit 37 sets the second image determination threshold TH3_2 serving as the image determination threshold TH3 in the third comparison unit 36.

Figure 4:
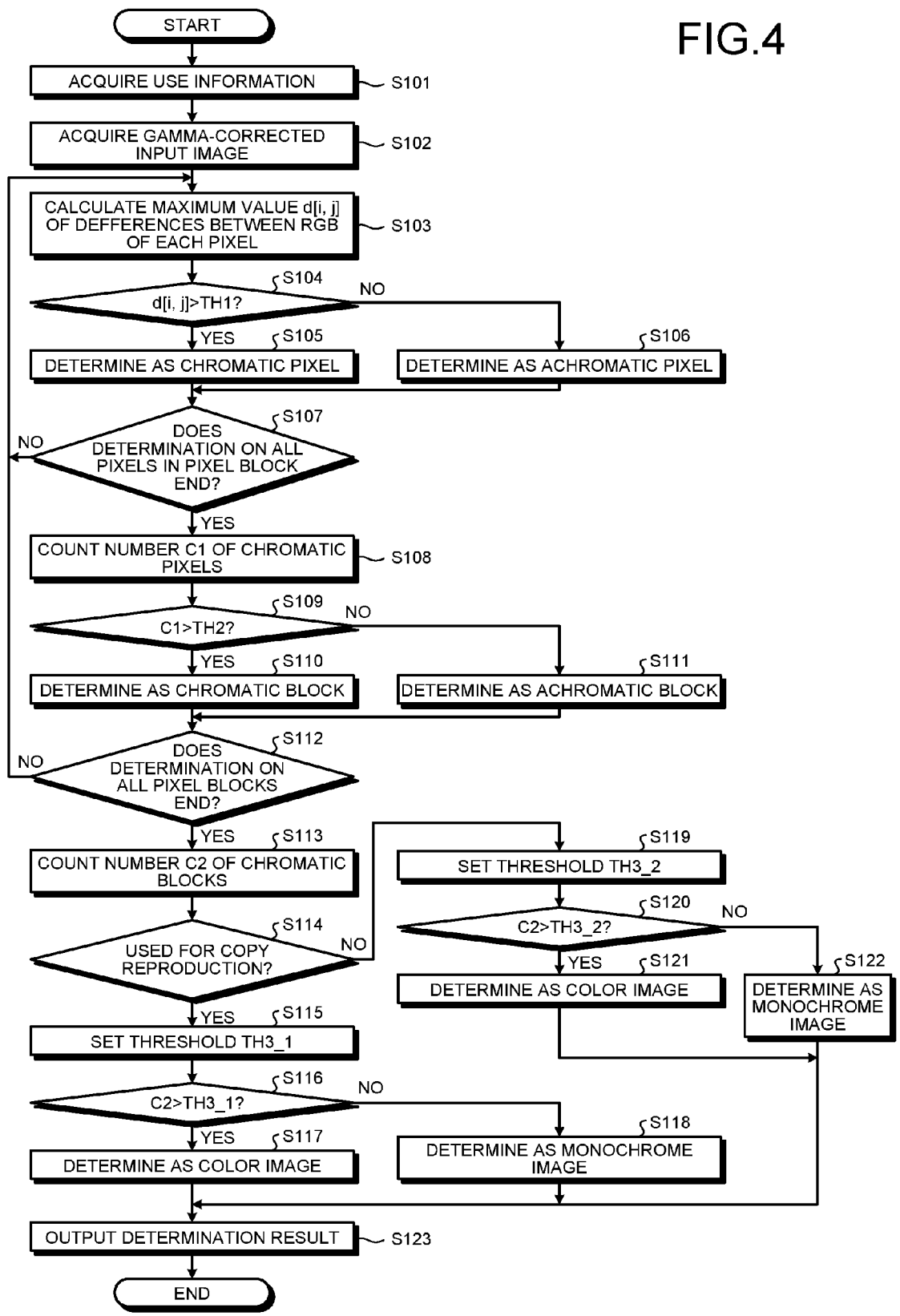
FIG. 4 is a flowchart of a sequence of a process performed by the determining unit.

FIG. 4 is a flowchart of a sequence of a process performed by the determining unit 13 that has the above-described configuration.

First of all, the determining unit 13 acquires use information that is input from the operation panel 4 (step S101) and acquires a gamma-corrected input image (RGB image signal) that is output from the gamma correction unit 11 (step S102).

The maximum value calculation unit 31 calculates a maximum value d[i,j] of the differences between RGB of each pixel of the gamma-corrected input image that is acquired at step S102 (step S103). The first comparison unit 32 compares the maximum value d[i,j] that is calculated at step S103 with the pixel determination threshold TH1 (step S104). When the maximum value d[i,j] exceeds the pixel determination threshold TH1 (YES at step S104), the first comparison unit 32 determines that the pixel is a chromatic pixel (step S105). On the other hand, when the maximum value d[i,j] is equal to or smaller than the pixel determination threshold TH1 (NO at step S104), the first comparison unit 32 determines that the pixel is an achromatic pixel (step S106).

Then it is determined whether determination on all pixels constituting one pixel block ends (step S107). When there is a pixel on which determination does not end (NO at step S107), the process returns to step S103 and the processing at step S103 and the following steps is repeated.

On the other hands, when determination on all pixels in the pixel block ends (YES at step S107), the chromatic pixel counter 33 counts the number C1 of chromatic pixels in the pixel block (step S108). The second comparison unit 34 then compares the number C1 of chromatic pixels in the pixel block that is counted at step S108 with the block determination threshold TH2 (step S109). When the number C1 of chromatic pixels exceeds the determination threshold TH2 (YES at step S109), the second comparison unit 34 determines that the pixel block is a chromatic block (step S110). On the other hand, when the number C1 of chromatic pixels is equal to or smaller than the determination threshold TH2 (NO at step S109), the second comparison unit 34 determines that the pixel block is an achromatic block (step S111).

Then it is determined whether determination on all pixel blocks contained in the gamma-corrected input image ends (step S112). When there is a pixel block on which determination does not end (NO at step S112), the process returns to step S103 and the processing at step S103 and the following steps is repeated. On the other hand, when determination on all pixel blocks contained in the gamma-corrected input image ends (YES at step S112), the chromatic block counter 35 counts the number C2 of chromatic blocks contained in the gamma-corrected input image (step S113).

On the basis of the use information that is acquired at step S101, it is determined whether the input image is used for copy reproduction or compression transmission (step S114). When the input image is used for copy reproduction (YES at step S114), the threshold setting unit 37 sets the first image determination threshold TH3_1 in the third comparison unit 36 (step S115). The third comparison unit 36 then compares the number C2 of chromatic blocks, which is counted at step S113, with the first image determination threshold TH3_1 (step S116). When the number C2 of chromatic blocks exceeds the first image determination threshold TH3_1 (YES at step S116), the third comparison unit 36 determines that the gamma-corrected input image is a color image (step S117). On the other hand, when the number C2 of chromatic blocks is equal to or smaller than the first image determination threshold TH3_1 (NO at step S116), the third comparison unit 36 determines that the gamma-corrected input image is a monochrome image (step S118).

When the input image is used for compression transmission (NO at step S114), the threshold setting unit 37 sets the second image determination threshold TH3_2 in the third comparison unit 36 (step S119). Then the third comparison unit 36 compares the number C2 of chromatic blocks, which is counted at step S113, with the second image determination threshold TH3_2 (step S120). When the number C2 of chromatic blocks exceeds the second image determination threshold TH3_2 (YES at step S120), the third comparison unit 36 determines that the gamma-corrected input image is a color image (step S121). On the other hand, when the number C2 of chromatic blocks is equal to or smaller than the second image determination threshold TH3_2 (NO at step S120), the third comparison unit 36 determines that the gamma-corrected input image is a monochrome image (step S122).

The result of determination made by the third comparison unit 36 is then output from the determining unit 13 (step S123) and the series of processing performed by the determining unit 13 ends. The result of determination made by the third comparison unit 36 is transmitted to the signal conversion unit 14 when the input image is used for copy reproduction, and the result is transmitted to the data I/F 16 when the input image is used for compression transmission.

The above-described configuration and operations of the determining unit 13 are an example only and is not limiting. In other words, it suffices if the determining unit be configured to determine whether a gamma-corrected input image is a color image or a monochrome image according to the determination rule according to which it is more easily determined that the gamma-corrected input image is a color image when the input image is used for copy reproduction than when the input image is used for compression transmission. For example, the above-described determining unit 13 is configured to switch the image determination threshold TH3 according to the use of the input image. The determining unit 13 may be configured to switch, in addition to the image determination threshold TH3, the pixel determination threshold TH1 and the block determination threshold TH2. In the case where the pixel determination threshold TH1 is switched according to the use of the input image, it suffices if the pixel determination threshold TH1 be set to a larger value when the input image is used for compression transmission than when the input image is used for copy reproduction. In the case where the block determination threshold TH2 is switched according to the use of the input image, it suffices if the block determination threshold TH2 be set to a larger value when the input image is used for compression transmission than when the input image is used for copy reproduction.

The signal conversion unit 14 converts the gamma-corrected input image (RGB image signal) that is transmitted from the gamma correction unit 11 via the switch 12 when the input image is used for copy reproduction into an image signal (c-m-y-Bk image signal) that can be processed by the plotter 3. The signal conversion unit 14 outputs the signal that is converted using a method that differs between the case where the determination result transmitted from the determining unit 13 represents that the gamma-corrected input image is a color image and the case where the determination result represents that the gamma-corrected input image is a monochrome image. According to the first embodiment, the gamma-corrected input image is held until the determination performed by the determining unit 13 ends and, after the determination performed by the determining unit 13 ends, the signal conversion unit 14 performs signal conversion. Note that, as in the technology according to Japanese Unexamined Patent Application Publication No. H8-65530, signal conversion performed by the signal conversion unit 14 may be started before the determination performed by the determining unit 13 ends and then, when the result of determination performed by the determining unit 13 represents that the gamma-corrected input image is a color image, the output of the signal conversion unit 14 is switched from one for monochrome image to one for color image.

Figure 5:
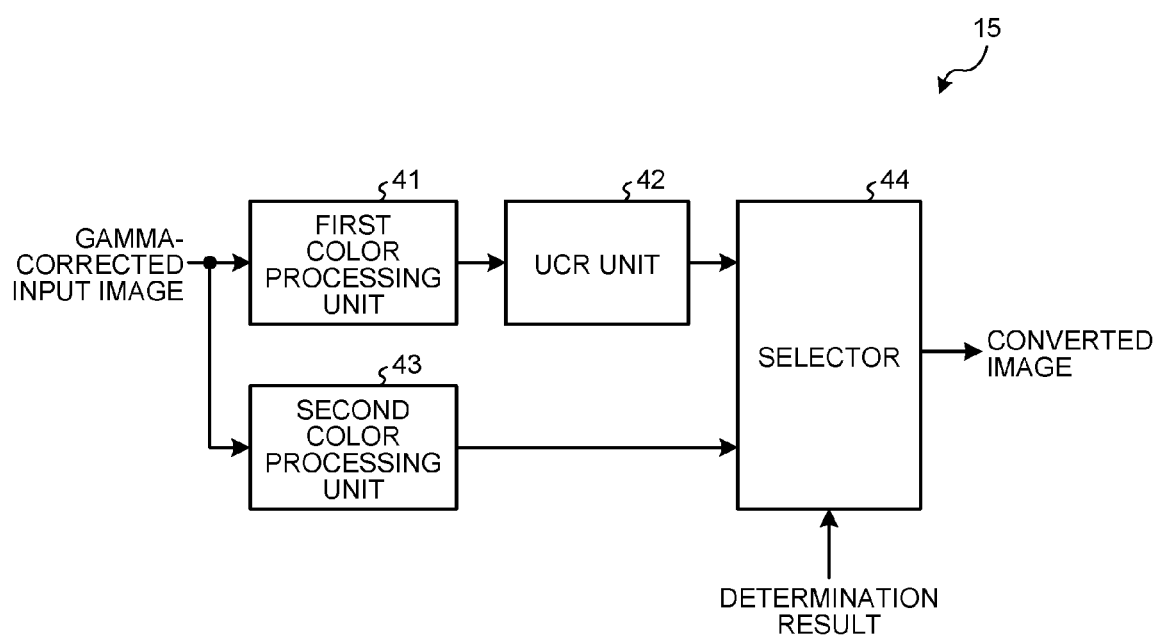
FIG. 5 is a block diagram of an exemplary configuration of a signal conversion unit.

FIG. 5 is a block diagram of an exemplary configuration of the signal conversion unit 14. The signal conversion unit 14 includes, for example, as illustrated in FIG. 5, a first color processing unit 41, a UCR unit 42, a second color processing unit 43, and a selector 44. The gamma-corrected input image (RGB image signal) that is transmitted from the gamma correction unit 11 via the switch 12 is input to the first color processing unit 41 and the second color processing unit 43 in series.

The first color processing unit 41 performs a color reproduction process for color image. In order to realize perfect color reproduction of the input image, for example, the first color processing unit 41 performs conversion from RGB to CMY by a 3×3 matrix operation represented by the following Equation (1). In order to improve accuracy of color reproduction, for example, the RGB space may be divided and the matrix operation may be performed on each of the divided areas.

$$\begin{pmatrix} C \\ M \\ Y \end{pmatrix} = (3 \times 3) \begin{pmatrix} R \\ G \\ B \end{pmatrix} \quad (1)$$

From CMY obtained through the color reproduction process performed by the first color processing unit 41, the UCR unit 42 generates a black signal and performs replacement with the black signal according to the following Equations (2) to (5). The c-m-y-Bk image signal obtained through the process performed by the UCR unit 42 is input to the selector 44. Note that a in Equation (2) is an adjustment parameter that takes a value between 0 to 1.0.

$$Bk = \alpha \times \min(C, M, Y) \quad (2)$$

$$c = C - Bk \quad (3)$$

$$m = M - Bk \quad (4)$$

$$y = Y - Bk \quad (5)$$

On the other hand, the second color processing unit 43 performs a color reproduction process for monochrome image. The color reproduction process performed by the second color processing unit 43 is, for example, a process for calculating a signal (Bk0 image signal) corresponding to the luminance from the RGB image signal. The Bk0 image signal obtained through the process performed by the second color processing unit 43 is input to the selector 44.

According to the determination result that is transmitted from the determining unit 13, the selector 44 chooses a c-m-y-Bk image signal for color image or a Bk0 image signal for monochrome image and outputs the signal to the printer correction unit 15. The image signal that is output from the signal conversion unit 14 to the printer correction unit 15 will be referred to as a "converted image". In other words, when the determination result transmitted from the determining unit 13 represents that the gamma-corrected input image is a color image, the selector 44 chooses the c-m-y-Bk image signal as a converted image and outputs the c-m-y-Bk image signal to the printer correction unit 15 and, when the determination result transmitted from the determining unit 13 represents that the gamma-corrected output image is a monochrome image, the selector 44 chooses the Bk0 image signal as a converted image and outputs the Bk0 image signal to the printer correction unit 15.

The printer correction unit 15 performs a gamma correction process and dithering corresponding to the characteristics unique to the plotter 3 on the converted image that is input from the signal conversion unit 14 and outputs the converted image as an output image to the plotter 3. With respect to the gamma correction processing and dithering performed by the printer correction unit 15, the process may be switched according to the result of determination made by the determining unit 13 such that the fidelity of the output image with respect to the input image is higher in the case where it is determined that the gamma-corrected input image is a color image than in the case where it is determined that the input image is a monochrome image.

The data I/F 16 is an interface for, when the input image is used for compression transmission, storing in the HDD 5 the gamma-corrected input image that is transmitted from the gamma correction unit 11 via the switch 12 and the determination result transmitted from the determining unit 13.

The communication device 20 will be described here. For example, as illustrated in FIG. 2, the communication device 20 includes an image compression unit 21 and a transmitter 22.

When the input image is used for compression transmission, the image compression unit 21 reads the gamma-corrected input image that is stored by the image processing device 10 in the HDD 5 and compresses the gamma-corrected input image for transmission. According to the result of determination performed by the determining unit 13 that is stored in the HDD 5 together with the gamma-corrected input image, the image compression unit 21 switches the compression method for the gamma-corrected input image according to whether it is determined that the gamma-corrected input image is a color image or it is determined that the gamma-corrected input image is a monochrome image.

To switch the compression method, the image compression unit 21 may use, for example, the technology according to Japanese Patent No. 2791314. In other words, the image compression unit 21 may be configured such that, when it is determined that the gamma-corrected input image is a color image, the image compression unit 21 performs compression using a three-channel signal and, when it is determined that the gamma-corrected input image is a monochrome image, the image compression unit 21 performs compression using a single-channel signal. Various attributes are conceivable as the attribute of the three-channel signal and the single-channel signal, and it suffices if the three-channel signal contains color information and the single-color signal does not contain color information. Any signal may be used according to the condition of the embodiment.

As an image compression method using the three-channel signal (for example, a RGB signal) or the single-channel signal (for example, a luminance signal), for example, a conventional method such as JPEG compression or JPEG2 compression may be used. The compressed image can be transmitted in a conventional format, such as the tagged image file format (TIFF) or the portable document format (PDF). Furthermore, with respect to the method of controlling the volume of data of the compressed image, when it is determined that the gamma-corrected input image is a monochrome image, a compression ratio that enables higher compression than in a case where it is determined that the gamma-corrected input image is a color image may be chosen.

The transmitter 22 transmits the compressed image that is compressed by the image compression unit 21 according to the result of determination performed by the determining unit 13 to, for example, an external device that is connected to the network.

As described in detail by exemplifying the specific example, in the image processing system 1 according to the first embodiment, the determination rule for color/monochrome determination performed by the determining unit 13 is changed according to the use of the input image, it is more easily determined that the gamma-corrected input image is a color image when the input image is used for copy reproduction than when the input image is used for compression transmission, and it is more easily determined that the gamma-corrected input image is a monochrome image when the input image is used for compression transmission than when the input image is used for copy reproduction. Accordingly, the image processing system 1 according to the first embodiment enables both preferable reproducibility on copy reproduction in which the plotter 3 records the output image corresponding to the input image on the recording medium and reduction of transmission costs and improvement of transmission rate on compression transmission in which the communication device 20 compresses and transmits the input image.

Second Embodiment

A second embodiment of the present invention will be described here. According to the second embodiment, not only the image processing device 10 but also the communication device 20 is provided with a determining unit that performs color/monochrome determination. When an input image is used for copy reproduction, the image processing device 10 performs color/monochrome determination according to the first determination rule and, when the input image is used for compression transmission, the communication device 20 performs color/monochrome determination according to the second determination rule. Note that the determining unit of the communication device 20 does not determine whether a pixel block contained in the input image (gamma-corrected input image) is a chromatic pixel block and uses the result of determination performed by the determining unit of the image processing device 10. In other words, when the input image is used for compression transmission, the determining unit of the image processing device 10 determines whether each pixel block contained in the input image is a chromatic block and generates a map image representing the positions of the chromatic blocks of the input image. The determining unit of the communication device 20 then performs color/monochrome determination using the map image that is generated by the determining unit of the image processing device 10.

Because the configuration and operations excluding the above-described aspect according to the second embodiment are the same as in the first embodiment, components common with the first embodiment are denoted with the same reference numerals as in the first embodiment and redundant descriptions will be omitted. Furthermore, to distinguish the image processing system, the image processing device, and the communication device according to the second embodiment from the image processing system, the image processing device, and the communication device according to the first embodiment, respectively, the image processing system, the image processing device, and the communication device according to the second embodiment will be referred to as an image processing system 1A, an image processing device 10A, and a communication device 20A.

Figure 6:
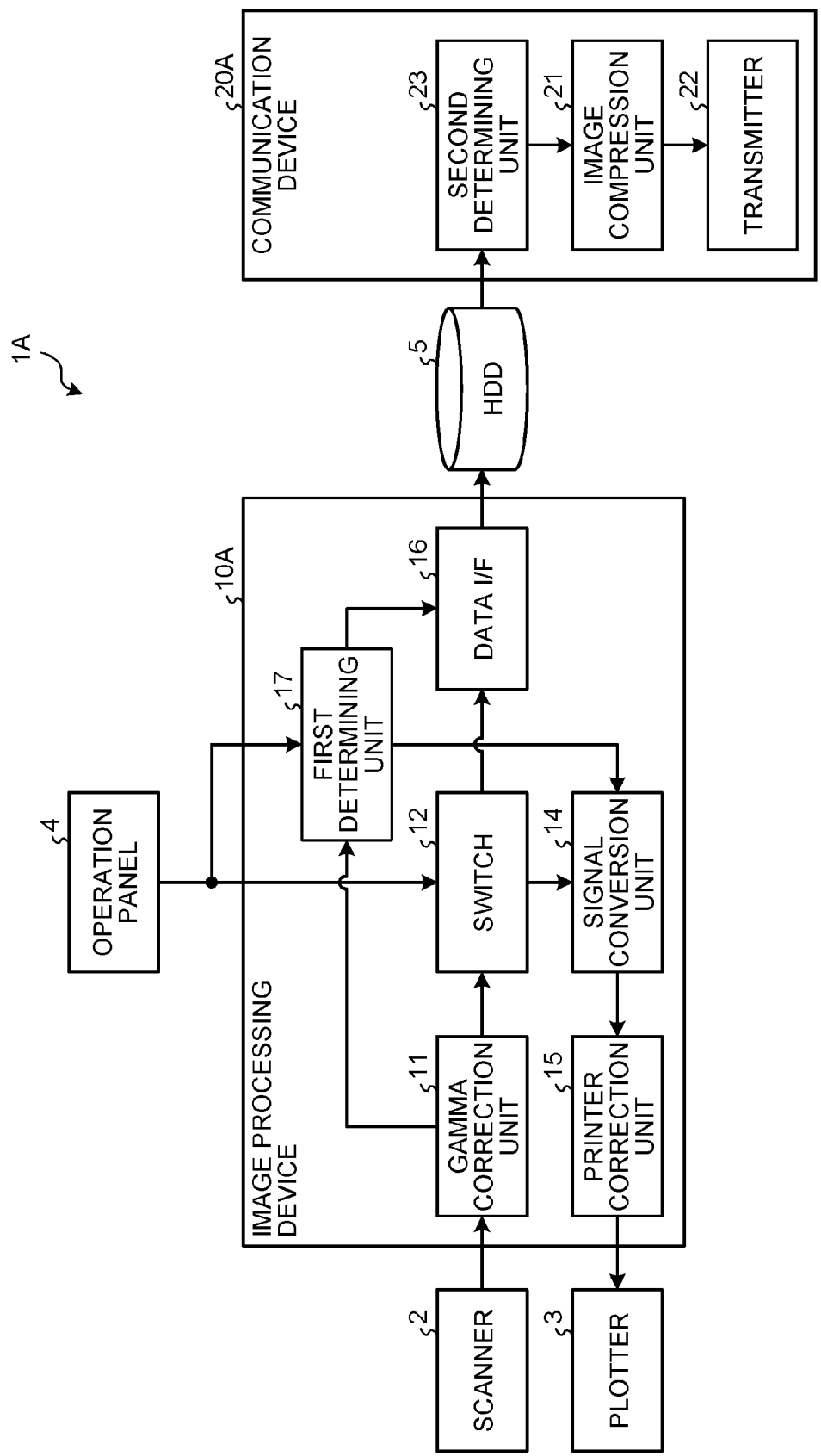
FIG. 6 is a block diagram of an exemplary functional configuration of an image processing device and a communication device.

FIG. 6 is a block diagram of an exemplary functional configuration of the image processing device 10A and the communication device 20A of the image processing system 1A according to the second embodiment. The image processing device 10A according to the second embodiment includes, as illustrated in FIG. 6, a first determining unit 17 instead of the determining unit 13 of the image processing device 10 according to the first embodiment (see FIG. 2). The communication device 20A according to the second embodiment includes, as illustrated in FIG. 6, a second determining unit 23 in addition to the components of the communication device 20 according to the first embodiment (see FIG. 2).

Figure 7:
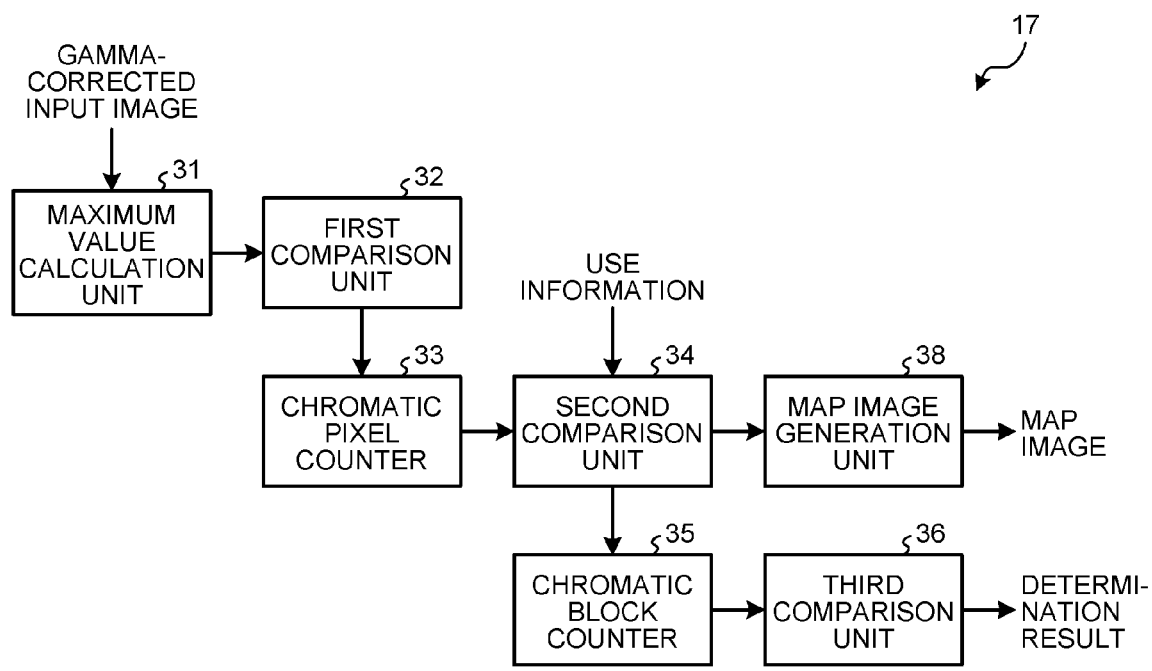
FIG. 7 is a block diagram of an exemplary configuration of a first determining unit.

FIG. 7 is a block diagram of an exemplary configuration of the first determining unit 17 of the image processing device 10A. The first determining unit 17 includes, for example, as illustrated in FIG. 7, the maximum value calculation unit 31, the first comparison unit 32, the chromatic pixel counter 33, the second comparison unit 34, the chromatic block counter 35, the third comparison unit 36, and a map image generation unit 38.

The maximum value calculation unit 31, the first comparison unit 32, the chromatic pixel counter 33, the second comparison unit 34, the chromatic block counter 35, and the third comparison unit 36 are components common with the determining unit 13 according to the first embodiment. Note that, in the first determining unit 17 according to the second embodiment, the second comparison unit 34 switches the destination to which the result of determination on whether a pixel block is a chromatic block or an achromatic block according to the use information that is input from the operation panel 4. In other words, when the use information that is input from the operation panel 4 represents copy reproduction, the second comparison unit 34 outputs the result of determination on whether a pixel block is a chromatic block or an achromatic block to the chromatic block counter 35 and, when the use information that is input from the operation panel 4 represents that the input image is used for compression transmission, the second comparison unit 34 outputs the result of determination on whether the pixel block is a chromatic block or an achromatic block to the map image generation unit 38.

Furthermore, in the first determining unit 17 according to the second embodiment, the third comparison unit 36 uses only the above-described first image determination threshold TH_3_1 to determine whether the gamma-corrected input image is a color image or a monochrome image. In other words, when the input image is used for copy reproduction, the third comparison unit 36 compares the number C2 of chromatic blocks that is counted by the chromatic block counter 35 with the first image determination threshold TH3_1. When the number C2 of chromatic blocks exceeds the first image determination threshold TH3_1, the third comparison unit 36 determines that the gamma-corrected input image is a color image. When the number C2 of chromatic blocks is equal to or smaller than the first image determination threshold TH3_1, the third comparison unit 36 determines that the gamma-corrected input image is a monochrome image.

Figure 8:
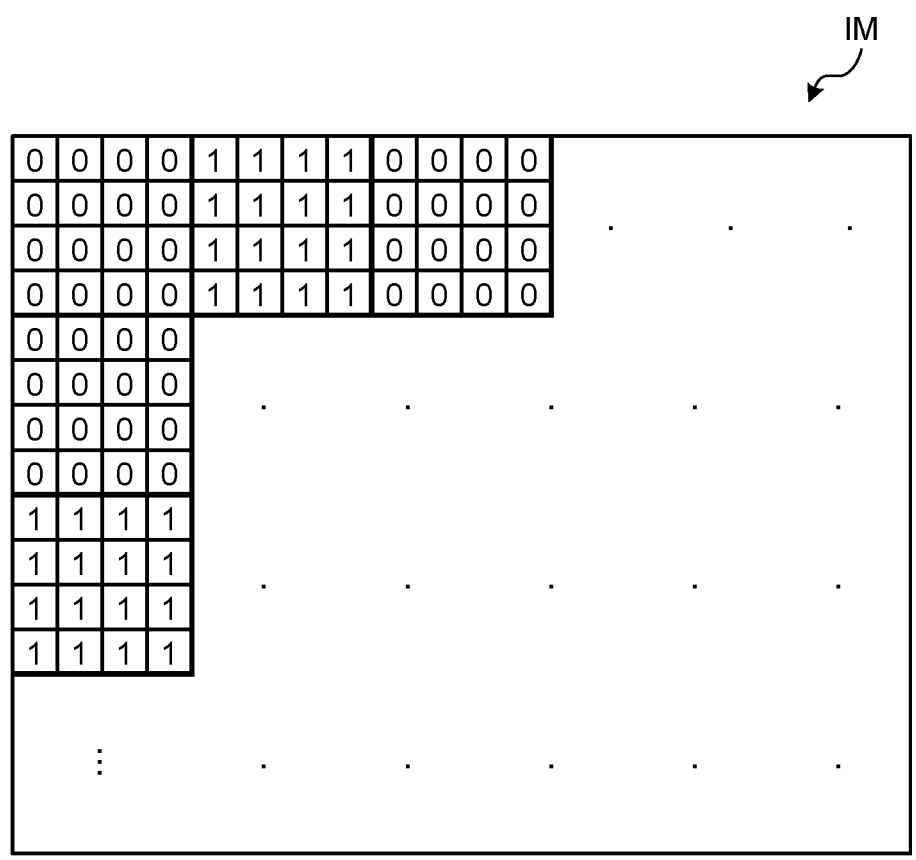
FIG. 8 is a diagram illustrating an overview of a map image.

When the input image is used for compression transmission, the map image generation unit 38 generates a map image representing the positions of the chromatic blocks of the input image according to the determination result that is output from the second comparison unit 34. FIG. 8 is a diagram illustrating an overview of a map image IM that is assumed for the second embodiment. The map image IM is, as illustrated in FIG. 8, two-dimensional information representing each pixel of an input image by one bit. For example, information of one bit according to the result of determination on whether the pixel block is a chromatic block is assigned to each pixel in a pixel block of four lines×four pixels. In other words, in the map image IM, all pixels in the pixel block are represented by the same value (1 or 0) according to whether the pixel block is a chromatic block.

In the exemplary map image IM illustrated in FIG. 8 has a configuration in which each pixel of the input image is represented by one bit. Alternatively, for example, each pixel block of the input image may be represented using information of one bit representing whether the pixel block is a chromatic block and information representing a range of the pixel block in the input image.

When the input image is used for compression transmission, the map image IM that is generated by the map image generation unit 38 is stored in the HDD 5 together with the gamma-corrected input image via the data I/F 16.

Figure 9:
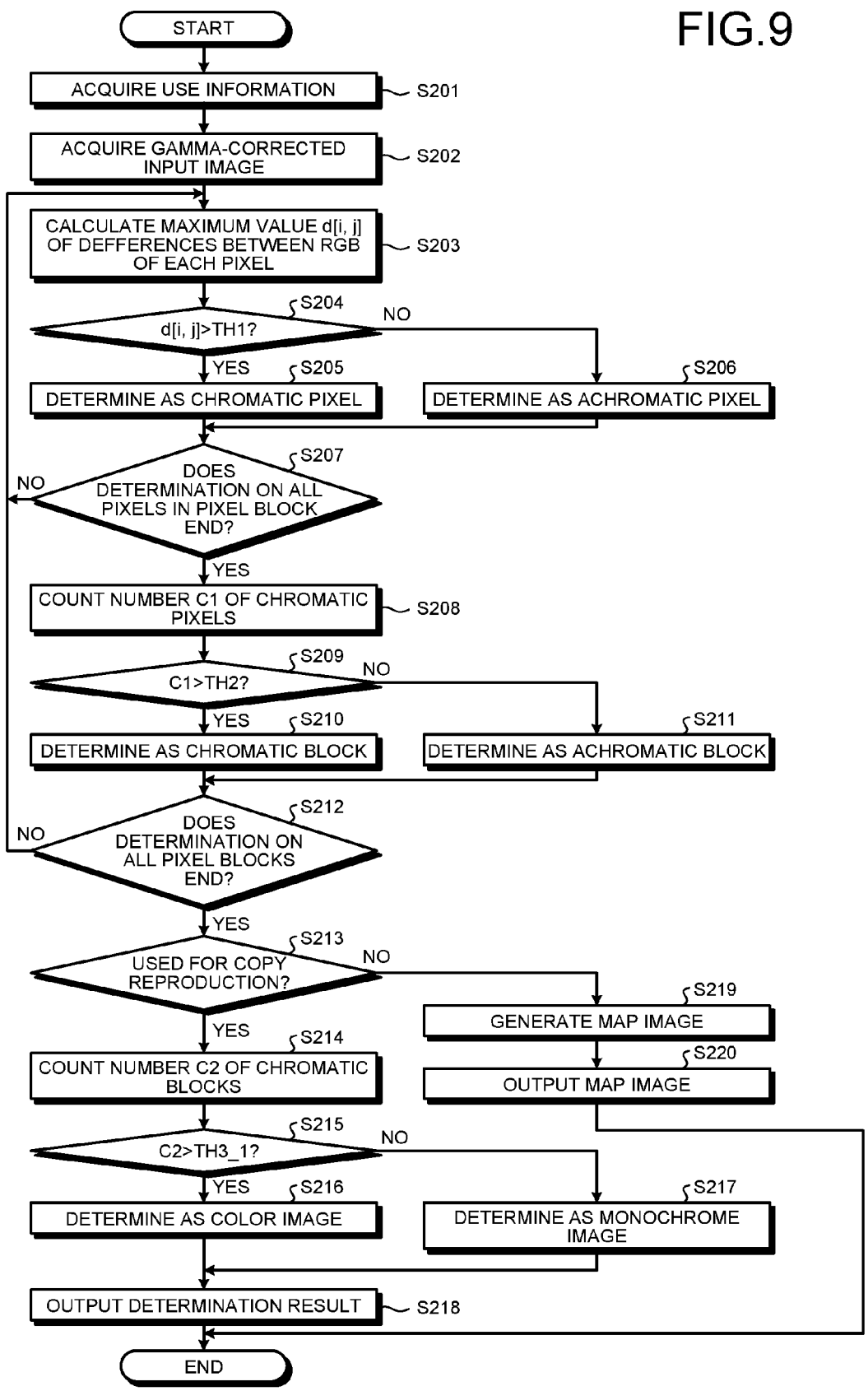
FIG. 9 is a flowchart of a sequence of a process performed by the first determining unit.

FIG. 9 is a flowchart of a sequence of a process performed by the first determining unit 17 having the above-described configuration. Because the processing from step S201 to step S212 in FIG. 9 is the same as the processing performed by the determining unit 13 according to the first embodiment (the processing from step S101 to step S112 in FIG. 4), descriptions thereof will be omitted.

According to the second embodiment, when determination on all pixels contained in the gamma-corrected input image ends (YES at step S212), it is determined whether the input image is used for copy reproduction or compression transmission on the basis of the use information that is acquired at step S201 (step S213). When the input image is used for copy reproduction (YES at step S213), the chromatic block counter 35 counts the number C2 of chromatic blocks contained in the gamma-corrected input image according to the result of determination performed by the second comparison unit 34 (step S214).

The third comparison unit 36 then compares the number C2 of chromatic blocks that is counted at step S214 with the image determination threshold TH3_1 (step S215). When the number C2 of chromatic blocks exceeds the image determination threshold TH3_1 (YES at step S215), the third comparison unit 36 determines that the gamma-corrected input image is a color image (step S216). On the other hand, when the number C2 of chromatic blocks is equal to or smaller than the image determination threshold TH3_1 (NO at step S215), the third comparison unit 36 determines that the gamma-corrected input image is a monochrome image (step S217). The result of determination performed by the third comparison unit 36 is then output to the signal conversion unit 14 (step S218) and the series of processing performed by the first determining unit 17 ends.

On the other hand, when the input image is used for compression transmission (NO at step S213), the map image generation unit 38 generates a map image according to the result of determination performed by the second comparison unit 34 (step S219). The map image generated by the map image generation unit 38 is output to the data I/F 16 (step S220) and the series of processing performed by the first determining unit 17 ends.

Figure 10:
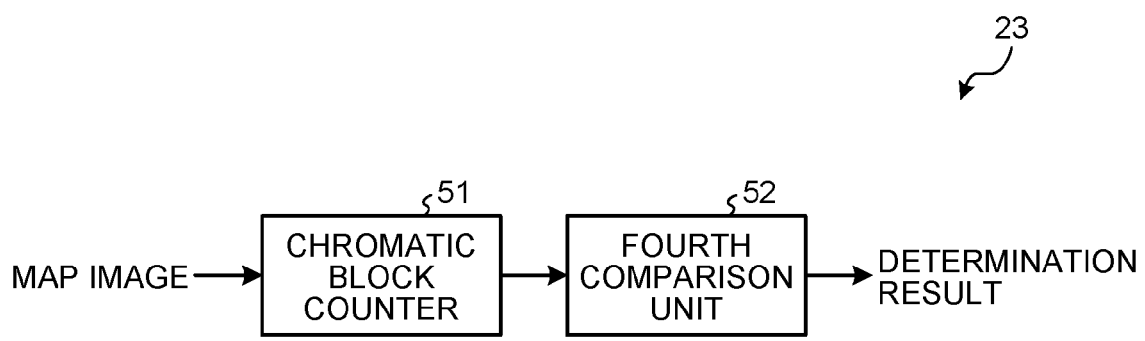
FIG. 10 is a block diagram of an exemplary configuration of a second determining unit.

FIG. 10 is a block diagram of an exemplary configuration of the second determining unit 23 of the communication device 20A. The second determining unit 23 includes, for example, as illustrated in FIG. 10, a chromatic block counter 51 and a fourth comparison unit 52.

When the input image is used for compression transmission, the chromatic block counter 51 counts the number C2 of chromatic blocks contained in the gamma-corrected input image on the basis of the map image that is read from the HDD 5.

The fourth comparison unit 52 compares the number C2 of chromatic blocks, which is counted by the chromatic block counter 51, with the second image determination threshold TH3_2 and the third image determination threshold TH3_3 and determines whether the gamma-corrected input image is a color image, a monochrome image, or a color-monochrome mixed image in which both a color area and a monochrome area are mixed. The third image determination threshold Th3_3 is set to a value smaller than the second image determination threshold Th3_2. When the number C2 of chromatic blocks that is counted by the chromatic block counter 51 exceeds the second image determination threshold TH3_2, the fourth comparison unit 52 determines that the gamma-corrected input image is a color image. When the number C2 of chromatic blocks does not reach the third image determination threshold TH3_3, the fourth comparison unit 52 determines that the gamma-corrected input image is a monochrome image. When the number C2 of chromatic blocks is equal to or larger than the third image determination threshold TH3_3 and is equal to or smaller than the second image determination threshold TH3_2, the fourth comparison unit 52 determines that the gamma-corrected input image is a color-monochrome mixed image.

According to the second embodiment, the fourth comparison unit 52 is configured to determine whether the gamma-corrected input image is a color image, a monochrome image, or a color-monochrome mixed image using the second image determination threshold TH3_2 and the third image determination threshold TH3_3. Alternatively, the fourth comparison unit 52 may be configured to determine whether the gamma-corrected input image is a color image or a monochrome image using only the second image determination threshold TH3_2 as in determination performed by the third comparison unit 36 of the determining unit 13 when the input image is to be compressed and transmitted according to the first embodiment. Note that, as in the second embodiment, when it is determined whether the gamma-corrected input image is a color image, a monochrome image, or a color-monochrome mixed image using the third image determining unit TH_3 in addition to the second image determining unit TH_2, more refined compression control can be performed by the image compression unit 21 as described below.

Figure 11:
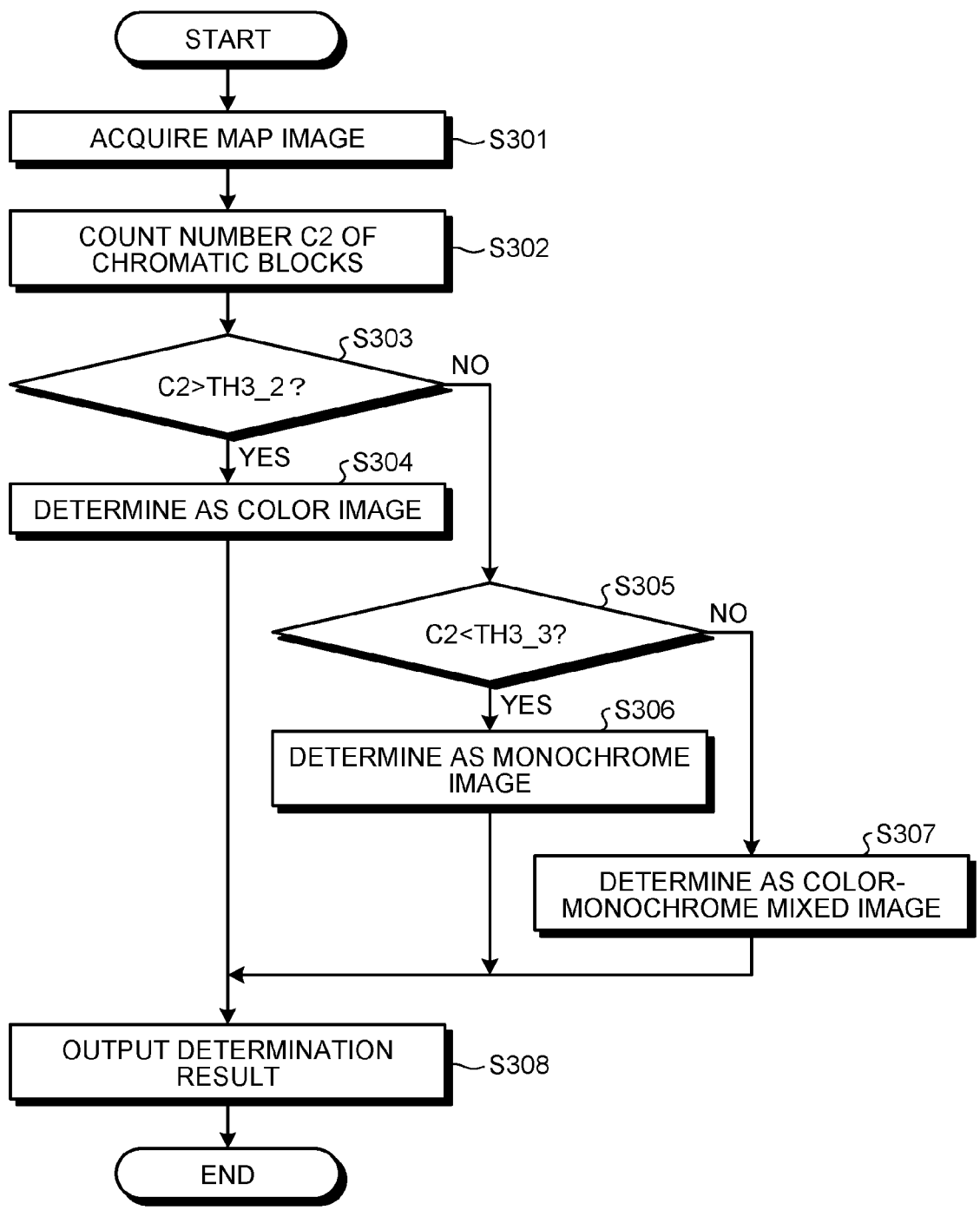
FIG. 11 is a flowchart of a sequence of a process performed by the second determining unit.

FIG. 11 is a flowchart of a sequence of a process performed by the second determining unit 23 having the above-described configuration.

When the input image is used for compression transmission, as described above, a map image that is generated by the first determining unit 17 of the image processing device 10A is stored in the HDD 5. First of all, the second determining unit 23 reads the map image from the HDD 5 to acquire the map image (step S301).

On the basis of the map image that is acquired at step S301, the chromatic block counter 51 counts the number C2 of chromatic blocks contained in the gamma-corrected input image (step S302).

The fourth comparison unit 52 compares the number C2 of chromatic blocks that is counted at step S302 with the second image determination threshold TH3_2 (step S303). When the number C2 of chromatic blocks exceeds the second image determination threshold TH3_2, the fourth comparison unit 52 determines that the gamma-corrected input image is a color image (step S304).

On the other hand, when the number C2 of chromatic blocks is equal to or smaller than the second image determination threshold TH3_2, the fourth comparison unit 52 then compares the number C2 of chromatic blocks that is counted at step S302 with the third image determination threshold TH3_3 (step S305). When the number C2 of chromatic blocks is smaller than the third image determination threshold TH3_3 (YES at step S305), the fourth comparison unit 52 determines that the gamma-corrected input image is a monochrome image (step S306).

On the other hand, when the number C2 of chromatic blocks is equal to or larger than the third image determination threshold TH3_3 (NO at step S305), the fourth comparison unit 52 determines that the gamma-corrected input image is a color-monochrome mixed image (step S307).

The result of determination performed by the fourth comparison unit 52 is then output to the image compression unit 21 (step S308) and the series of processing performed by the second determining unit 23 ends.

In the communication device 20A according to the second embodiment, when the determination result that is input from the second determining unit 23 represents that the gamma-corrected input image is a color image or a monochrome image, the image compression unit 21 is able to switch the compression method for the gamma-corrected input image according to whether the gamma-corrected input image is a color image or a monochrome image using the same method as the above-described method according to the first embodiment. Furthermore, when the determination result that is input from the second determining unit 23 represents that the gamma-corrected input image is a color-monochrome mixed image, the image compression unit 21 is able to perform more refined compression control including specifying the positions of color blocks on the basis of the map image corresponding to the gamma-corrected input image and switching between compression for color image and compression for monochrome image, for example, with respect to each block.

As described in detail by exemplifying the specific examples, according to the second embodiment, when the input image is used for copy reproduction, the first determining unit 17 of the image processing device 10A performs the color/monochrome determination on the input image according to the determination rule according to which it is more easily determined that the input image is a color image than when the input image is used for compression transmission. When the input image is used for compression transmission, the first determining unit 17 performs color/monochrome determination on the input image according to the determination rule according to which it is more easily determined that the input image is a monochrome image than when the input image is used for copy reproduction. Accordingly, as in the first embodiment, the second embodiment enables both preferable reproducibility on copy reproduction and reduction of transmission costs and improvement of transmission rate on compression transmission.

According to the second embodiment, the second determining unit 23 of the communication device 20A determines whether the input image is a color image, a monochrome image, or a color-monochrome mixed image. When it is determined that the input image is a color-monochrome mixed image, the image compression unit 21 performs refined compression control, for example, switches between compression for color image and compression for monochrome image with respect to each pixel block using a map image corresponding to the input image. Therefore, both preferable reproducibility on copy reproduction and reduction of transmission costs and improvement of transmission rate on compression transmission are realized while enabling effective inhibition of reproducibility of the input image to be compressed and transmitted from lowering.

Supplementary Explanation

When a general-purpose computer system including, for example, a CPU, a RAM and a ROM is used as hardware, the hardware and software (program) can cooperate to implement the determining unit 13, the first determining unit 17, and the second determining unit 23 that are described above. In this case, programs for implementing the determining unit 13, the first determining unit 17, and the second determining unit 23 can be provided by incorporating the programs in, for example, the ROM of the computer system. The programs may be recorded in a file in an installable form or an executable form in the computer system in a computer-readable recording medium, such as a CD-ROM, a flexible disk (FD), a CD-R, or a DVD to provide the program. Alternatively, the programs may be configured to be provided in such a way that the programs are stored in another computer that is connected to a network, such as the Internet, and are downloaded to the computer system via the network. Alternatively, the programs may be configured to be provided or distributed via a network, such as the Internet.

For the first and second embodiments, a MFP is assumed as the image processing system 1 and an example in which the image processing device 10 is provided in the MFP. Alternatively, the image processing device 10 may be implemented as another device that is independent of the MFP. Alternatively, the functional components of the image processing device 10 may be distributed to multiple devices that are physically separated and the multiple devices cooperate to implement the operations of the image processing device 10.

Furthermore, according to the first and second embodiments, the process of compressing the input image for transmission is performed by the communication device 20 that is external with respect to the image processing device 10. Alternatively, compression of the input image may be performed in the image processing device 10. In this case, the communication device 20 receives the compression image that is compressed for transmission directly from the image processing device 10 or via the HDD 5 and transmits the compressed image via, for example, network distribution.

An embodiment provides an effect that both preferable reproducibility on recording an output image corresponding to an input image on a recording medium and reduction of transmission costs and improvement of transmission rate on compressing and transmitting the input image are enabled.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing system comprising:
   an image recorder configured to record an output image corresponding to an input image on a recording medium;
   memory storing computer-readable instructions; and
   one or more processors configured to execute the computer-readable instructions such that the one or more processors are configured to perform operations including,
   compressing the input image for transmission; and
   determining whether the input image is a color image or a monochrome image according to a first determination rule if the output image is to be recorded on the recording medium, and determine whether the input image is the color image or the monochrome image according to a second determination rule different from the first determination rule if the input image is to be compressed for transmission, wherein
      when the output image is to be recorded on the recording medium, the one or more processors output a gamma corrected input image corresponding to characteristics of the image recorder on the converted image that is input from the signal conversion unit, and
      when the output image is to be compressed, output and compress a gamma corrected input image to a transmitter and transmit the compressed image to an external device that is connected to the image processing system.

2. The image processing system according to claim 1, wherein the one or more processors are further configured to perform operations including
   determining whether each pixel block of a predetermined number of pixels that is contained in the input image is a chromatic block, wherein
   the first determination rule is a determination rule according to which it is determined that the input image is the color image if a number of chromatic blocks exceeds a first threshold, and
   the second determination rule is a determination rule according to which it is determined that the input image is the color image if the number of the chromatic blocks exceeds a second threshold that is larger than the first threshold.

3. The image processing system according to claim 2, wherein the one or more processors are further configured to perform operations including setting a threshold for the number of the chromatic blocks to the first threshold if the output image is to be recorded in the recording medium, and setting the threshold for the number of the chromatic blocks to the second threshold if the input image is to be compressed for transmission.

4. The image processing system according to claim 2, wherein
   the one or more processors are further configured to perform operations including setting a threshold for the number of the chromatic blocks to the first threshold and a setting a threshold for the number of the chromatic blocks to the second threshold, wherein
   if the output image is to be recorded in the recording medium, the one or more processors determines whether the input image is the color image or the monochrome image, and
   if the input image is to be compressed for transmission, the one or more processors determines whether the input image is the color image or the monochrome image.

5. The image processing system according to claim 4, wherein
the first determination has a function of determining whether each pixel block is the chromatic block, and
if the input image is to be compressed for transmission, the one or more processors compares the number of pixel blocks that are determined as the chromatic blocks with the second threshold to determine whether the input image is the color image or the monochrome image.

6. The image processing system according to claim 5, wherein
if the input image is to be compressed for transmission, the one or more processors generates a map image representing the positions of the chromatic blocks in the input image and the one or more processors uses the map image acquired to compare the number of pixel blocks determined as the chromatic blocks with the second threshold.

7. The image processing system according to claim 6, wherein a third threshold smaller than the second threshold is set in addition to the second threshold as a threshold for the number of the chromatic blocks and the one or more processors determines that the input image is the color image if the number of the chromatic blocks exceeds the second threshold, determines that the input image is the monochrome image if the number of the chromatic blocks does not reach the third threshold, and determines that the input image is a color-monochrome mixed image in which a color area and a monochrome area are mixed if the number of the chromatic blocks is equal to or larger than the third threshold and is equal to or smaller than the second threshold.

8. An image processing method performed by an image processing system including an image recorder configured to record an output image corresponding to an input image on a recording medium and one or more processors configured to compress the input image for transmission, the image processing method comprising:
determining whether the input image is a color image or a monochrome image according to a first determination rule if the output image is to be recorded on the recording medium; and
determining whether the input image is the color image or the monochrome image according to a second determination rule different from the first determination rule if the input image is to be compressed for transmission, wherein
when the output image is to be recorded on the recording medium, outputting a gamma corrected input image corresponding to characteristics of the image recorder on the converted image that is input from the signal conversion unit, and
when the output image is to be compressed, outputting and compressing a gamma corrected input image to a transmitter and transmitting the compressed image to an external device that is connected to the image processing system.

9. An image processing device comprising:
an image recorder configured to record an output image corresponding to an input image on a recording medium;
one or more processors configured to compress the input image for transmission; and
determine whether the input image is a color image or a monochrome image according to a first determination rule if the output image is to be recorded on the recording medium, and determine whether the input image is the color image or the monochrome image according to a second determination rule different from the first determination rule if the input image is to be compressed for transmission, wherein
when the output image is to be recorded on the recording medium, the one or more processors output a gamma corrected input image corresponding to characteristics of the image recorder on the converted image that is input from the signal conversion unit, and
when the output image is to be compressed, output and compress a gamma corrected input image to a transmitter and transmit the compressed image to an external device that is connected to the image processing system.

* * * * *